United States Patent [19]

Elliott

[11] 3,853,281

[45] Dec. 10, 1974

[54] VACUUM TAPE REEL

[75] Inventor: Robert Ralph Elliott, Santa Ana, Calif.

[73] Assignee: Century Data Systems, Inc., Anaheim, Calif.

[22] Filed: Oct. 19, 1972

[21] Appl. No.: 299,035

[52] U.S. Cl. .................................. 242/74, 242/68.1
[51] Int. Cl. .......................................... B65h 75/28
[58] Field of Search ................... 242/74, 68.1, 56 R; 269/21; 51/235; 118/6

[56] References Cited

UNITED STATES PATENTS

| | | | |
|---|---|---|---|
| 2,998,206 | 8/1961 | Pendleton | 242/68.1 |
| 3,127,122 | 3/1964 | Roshkind | 242/56 |
| 3,326,491 | 6/1967 | Bradt et al. | 242/74 |
| 3,730,134 | 5/1973 | Kadi | 118/6 |

*Primary Examiner*—Leonard D. Christian

[57] ABSTRACT

The specification discloses a frictionless seal for a vacuum take-up reel, and a tape hub design that can provide adequate air flow to initially draw-in the tape and assure tape adherence to the hub without physical damage to the tape and data.

2 Claims, 2 Drawing Figures

VACUUM TAPE REEL

BACKGROUND OF THE INVENTION

The vacuum take-up reel is an essential component in the automatic tape loading of tape transports. The take-up system must perform efficiently to draw the tape through the reel flanges towards the hub as it rotates - finally causing the tape to adhere to the hub surface. The present invention is similar to the take-up reels used on prior art tape transports, but differs in the way that the vacuum is applied to the hub. The basic problem posed was to design a flow system that could function through a hollow motor shaft with a maximum I.D. of 3/8 inch and provide a vacuum seal at one end with minimal drag on the motor. In addition, maximum utilization of available air supply with no unnecessary losses was required.

SUMMARY OF THE INVENTION

The invention comprises a hollow shaft reel motor and hub assembly having a plurality of slots about the hub periphery. Vacuum is drawn through the hollow shaft to create a suction at the slots. The slots are of such a dimension that they will not damage the tape as it is initially captured by the vacuum.

DESCRIPTION OF A PREFERRED EMBODIMENT

Figure 1:
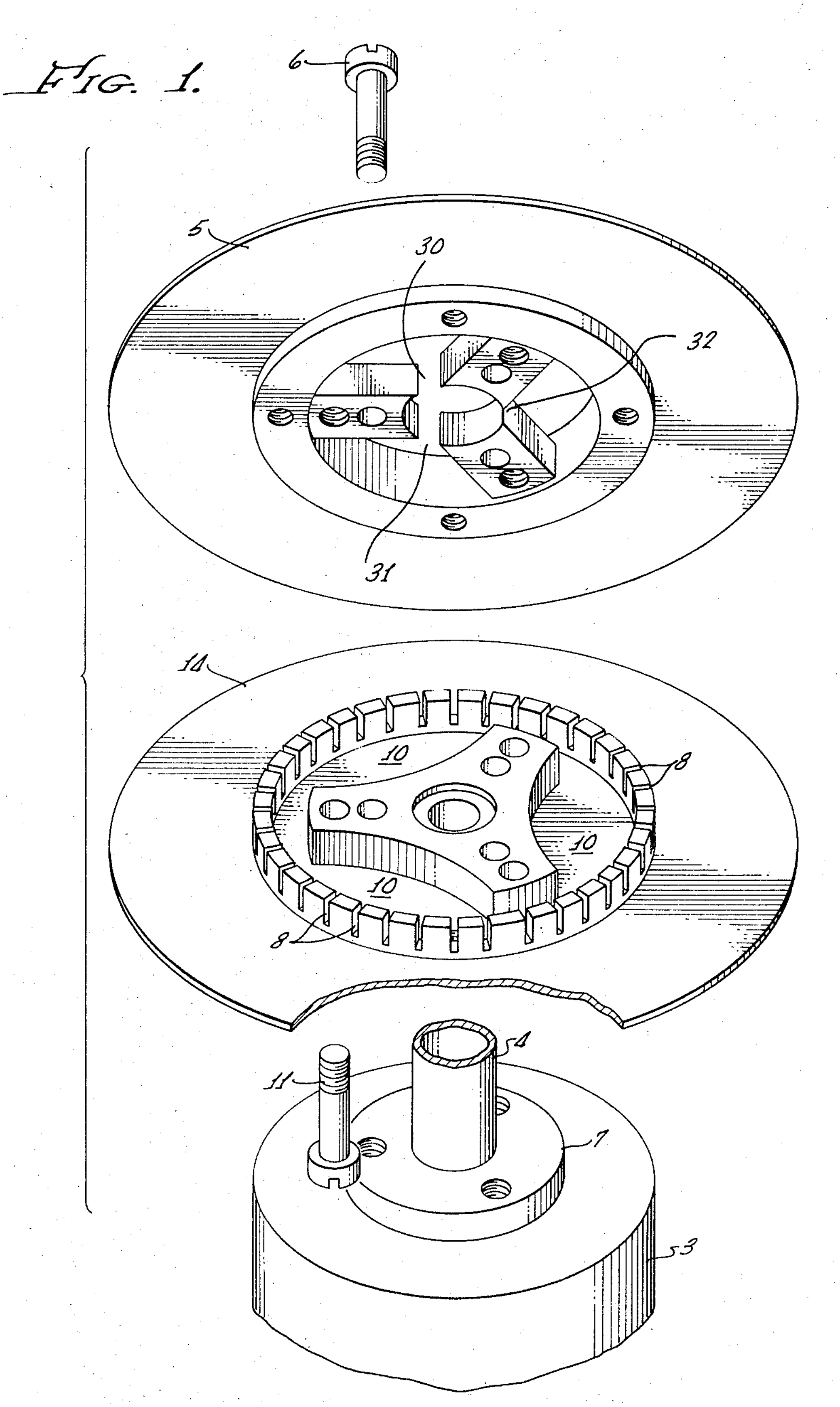
FIG. 1 is an exploded perspective view of the tape reel hub from the front or operators viewpoint.

Adverting to the drawings, and particularly FIG. 1, a preferred embodiment of the invention includes a motor 3 having a hollow shaft 4, a hub assembly comprising inner and outer members 14 and 5 which are bolted together (as indicated by bolt 11) and attached to the motor flange 7 (as indicated by bolt 6). Slots 8 located on the periphery of the hub of the inner member 14 function to capture the tape by vacuum drawn through hollow shaft 4 via gaps 30-32 and the hollow areas 10 formed when the inner and outer members 14 and 5 are bolted together. The slots are of a small dimension (approximately 0.020 × 1/4 of an inch in width) so as to avoid damage to tape and data during capture.

Figure 2:
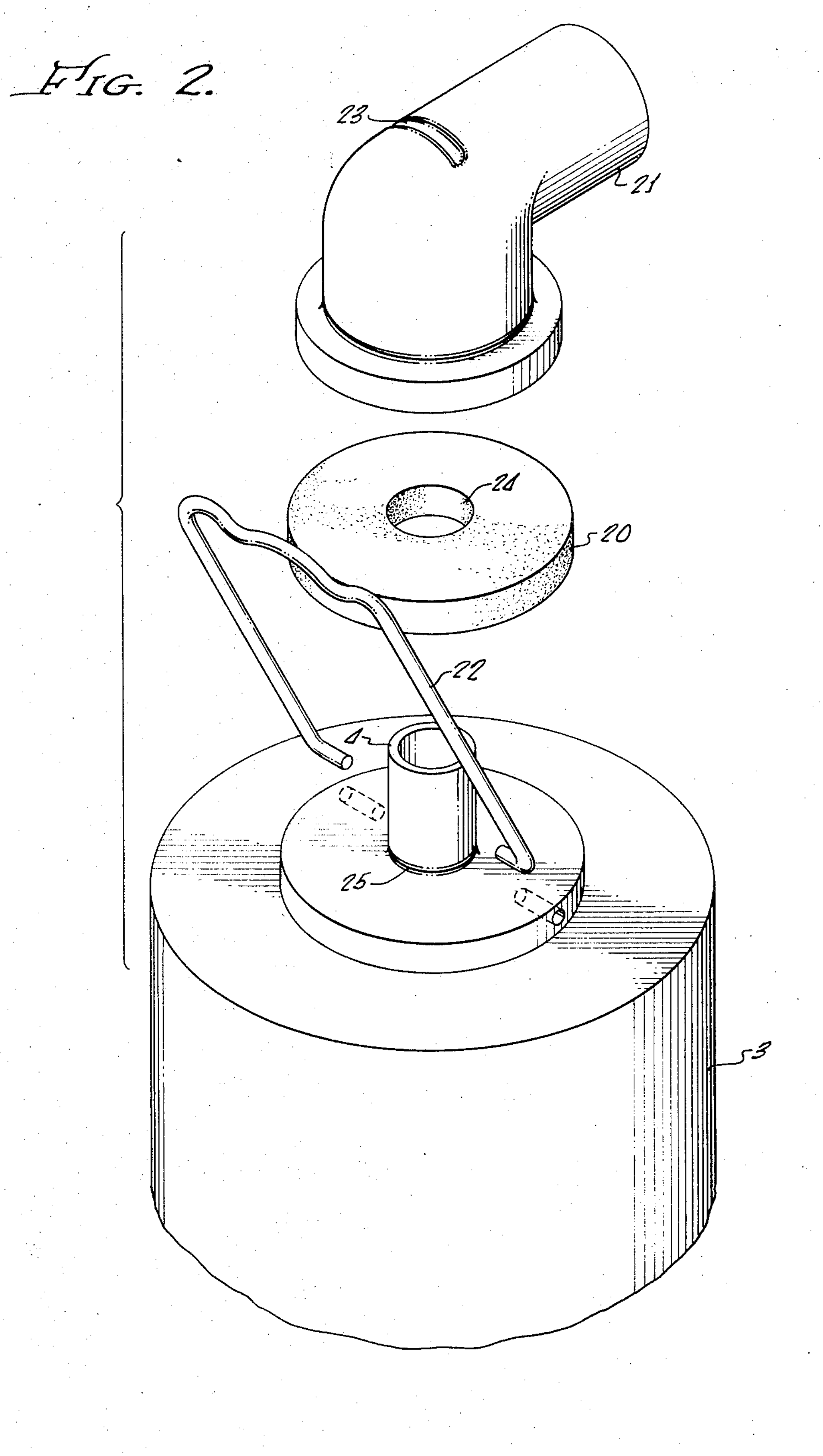
FIG. 2 is an exploded perspective view of vacuum seal arrangement from the rear of the motor.

Referring now to FIG. 2, the arrangement for supplying vacuum to the hollow motor shaft 4 comprises an elbow shaped tube member 21, retaining clip 22 and resilient ring 20. The elbow 21 is notched at the point 23 to accommodate clip 22. Vacuum supplied via elbow 21 is communicated to the slots 8 via hollow shaft 4 and hollow area 10. The rear motor bearing is sealed at 25 to prevent vacuum leakage; consequently the communication between the vacuum source and the slots 8 is an airtight one. It will be evident that this arrangement does not produce a frictional force or drag upon the rotating shaft, as would be the case if resilient ring 20 were used to seal against leakage between the hole 24 and shaft 4.

The present invention is not limited in its application to tape systems. It is equally useful to effect the transmission of vacuum or pressure through any revolving member. Thus, although a preferred embodiment has been shown and described, it will be understood that the invention is not limited thereto and that numerous changes, modifications and substitutions may be made without departing from the spirit of the invention.

I claim:

1.

a vacuum take up reel system comprising:
a motor having a hollow output power shaft;
means for sealing the rear bearing of said motor output shaft to produce an airtight seal between said motor and output shaft;
means for connecting a source of pressure different than atmospheric pressure to the rear of said motor so as to communicate with the hollow shaft, said means for connecting the source of pressure comprising:
a resilient washer having a hole larger than the outside diameter of said hollow shaft, said washer to be positioned to have its hole axially aligned with said hollow shaft;
a hollow elbow shaped tube member;
means for securing one opening of said elbow shaped tube member against the surface of said washer.

2.

A vacuum take up reel system comprising:
a motor having a hollow output power shaft;
means for sealing the rear bearing of said motor output shaft to produce an airtight seal between said motor and output shaft;
means for connecting a source of pressure different than atmospheric pressure to the rear of said motor so as to communicate with the hollow shaft;
a reel assembly having a plurality of openings about the hub;
means for attaching said reel assembly to the front end of said hollow output shaft;
passage means communicating the difference in pressure in said hollow shaft to the openings in said hub.

* * * * *